3,069,370
COACERVATION PROCESS FOR ENCAPSULATION OF LIPOPHILIC MATERIALS
Erik H. Jensen, Kalamazoo Township, Kalamazoo County, and John G. Wagner, Kalamazoo, Mich., assignors to The Upjohn Company, Kalamazoo, Mich., a corporation of Delaware
No Drawing. Filed Dec. 22, 1958, Ser. No. 785,104
26 Claims. (Cl. 260—23)

This invention relates to a novel article of manufacture more particularly to encapsulated, finely divided lipophilic material and to a process for the production thereof.

According to this invention, encapsulated, finely divided lipophilic material whose mantle comprises a polymer is prepared by a process which includes the steps of (1) preparing a dispersion of lipophilic material in an aqueous liquid solution of a polymer as defined hereinafter, (2) inducing liquid-liquid phase separation of the polymer by the addition of an insolubilizing salt, thereby inducing the polymer to encapsulate the dispersed lipophilic material, (3) adjusting the pH of the mixture so as to reduce the solubility of the mantle of the encapsulated material in the aqueous liquid, and (4) separating the thus-produced capsules from the aqueous liquid.

The novel encapsulated product of this invention is valuable as an article of manufacture in widely diversified fields. It is useful wherever lipophilic liquid, with or without other ingredients contained therein, is more readily handled temporarily as a solid or wherever the properties of a lipophilic solid are enhanced by the protective mantle of a polymer as herein defined. For example, the instant product can be employed in the printing art in the same manner as the coacervates described in U.S. 2,800,457 and 2,800,458 where a pressure-sensitive, reproducing film, e.g., on paper, plastic, cloth or wood, or a dry ink or dye, is desired which is non-staining in ordinary handling. It may be used as a storage form of readily oxidizable or light sensitive lipophilic material or to maintain otherwise incompatible mixtures, the encapsulated material being freed when needed by crushing, milling or by reversing the encapsulating process. The encapsulated product finds use in the even dispersing of lipophilic material onto films or sheets, the dry encapsulated material providing an excellent medium for handling otherwise sticky, oily, greasy, staining or unstable lipophilic material. In the lipophilic encapsulated material can be incorporated magnetic or magnetizable particles, e.g., to be used in the "memory" or information storage devices well known in the computer, indexing, television and tape recording arts. Alternatively, materials which are predictably altered by light, high frequency radiation, electronic bombardment or an electrical or magnetic field may be incorporated for use, for example, in the photographic and recording arts. The encapsulated product of this invention finds use in the soap art, where a fatted soap is desired or one containing an otherwise unstable antiseptic or antibiotic, the encapsulated product being produced with a fragile mantle that breaks on manipulation; in the fertilizer, plant hormone, insecticide, antifungal, antibacterial and antiparasiticidal arts, where a slow-release product is desired or one that is not immediately washed away by precipitation; in the adhesive field, e.g., for pressure sensitive tapes and labels or anticreeping adhesives; in the catalyst art where it is desirable to store the catalyzable material with the catalyst until the desired reaction is to take place, e.g., by removing the polymer mantle by breaking or heating or by chemical means, e.g., by adding a solvent for the polymer, or otherwise reversing the encapsulating process.

The product of this invention can be used for human consumption by employing a nontoxic, i.e., in the amount consumed, polymer and lipophilic material. Thus oily products, e.g., vitamins or edible vegetable, mineral or animal fats and oils, can be consumed per se in a dry state, maintained in a more stable state and/or incorporated in products where these edible oils or vitamins would otherwise produce an objectionable taste, texture or color or would be unstable. For example, vitamins or fats can thus be incorporated in dry cereals, margarine, ice creams, butter, milk or other dairy products, in fruits, vegetables and their juices, e.g., frozen orange juice, bread and other baked goods, jams and other condiments, or for maintaining unstable flavorings, the mantle being broken in cooking or mixing.

The encapsulated lipophilic material can have medicaments contained therein, vitamins or other diet supplements making the encapsulated product of this invention very useful in the pharmaceutical field. Thus products having sustained action can be produced; oral products can be prepared in which gastric irritation and/or drug destruction in the stomach is reduced; objectionable taste and/or odor can be reduced or eliminated; liquid preparations can be converted to dry products, stability of pharmaceuticals can be increased by preventing oxidative, hydrolytic or photolytic degradation of the drugs; more versatile formulation thereof can be achieved by separating incompatibles or producing stable emulsions, etc.; absorption characteristics of the active ingredient can be improved; preparations can be formulated in which one or more ingredient is encapsulated and thus protected until used and then liberated by rubbing or otherwise physically rupturing the mantle, e.g., in lotions, creams, ointments, chewable tablets or gum.

There are alternative methods available in the art which can accomplish by other means some of the results described above. A related process is one involving a coacervation as claimed in U.S. Patents 2,800,457 and 2,800,458. The processes claimed therein involve the use of a gelable hydrophilic colloid material, e.g., gelatin and agar-agar, by making an aqueous sol of that material, precipitating the colloid and thereafter cooling the resultant mixture below the gel point so as to produce a stable encapsulated product. It will be apparent from the description of this invention that the instantly claimed process does not involve that claimed coacervation process and that the encapsulated product of the instant process is of an entirely different nature than the gelable colloid coated products claimed in those patents.

DEFINITIONS

When employed to describe the instantly claimed processes, the following terms are defined as follows:

"Finely divided" means consisting essentially of small particles, e.g., a particle size of less than 2 mm. and preferably from about 0.5 to 200 microns;

"Mantle" means the film-like coating of polymer which envelops the lipophilic material;

"Aqueous" means comprising significant, e.g., 10–100%, water;

"Solution" means a true solution or a colloidal sol;

"Dispersion" means evenly distributed, either as an emulsion or a suspension of solids, e.g., so that the particle size is less than 2 mm., e.g., from about 0.5 to about 200 microns;

"Lipophilic" means having a relatively strong attraction for low dielectric constant, relatively non-polar media, e.g., fat or oil like in character and substantially insoluble in the aqueous mixture employed.

"Insolubilizing sale" means a salt, inorganic or organic, per se or as a solution, which precipitates as a liquid the polymer employed in the process of this invention;

"Linear macromolecular, synthetic polymer" means a non-naturally occurring, polymeric substance having an average molecular weight of at least 20,000 and having a linear, as opposed to a cross-linked, polymeric structure;

"Polymer unit" means the recurring structural unit derived from the starting monomer;

"Lipophilic unit" means a monomer residue in the polymer which has a relatively strong attraction for low dielectric constant, relatively non-polar media;

"Hydrophilic unit" means a monomer residue which has a relatively strong attraction for high dielectric constant, relatively polar media.

The polymers employed in this invention are those whose polymer units comprise both lipophilic and hydrophilic units, i.e., one class of recurring polymer unit is essentially lipophilic in character, e.g., one derived from styrene, an alkyl ring substituted styrene, an ether or ester substituted ethylene, and the other major recurring unit is essentially hydrophilic in character, e.g., derived from maleic acid, maleic acid amide, acrylic acid, crotonic acid, acrylic acid amide. In combination, these lipophilic and hydrophilic units preferably comprise a majority of the polymeric units present in the polymer. Other polymer units may also be present in the copolymer, so long as they are present in minor amounts, i.e., less than either the hydrophilic or lipophilic polymer units. Included among these polymers are the hydrolyzed styrene-maleic anhydride copolymers, styrene-maleic acid amide copolymer, the sulfonated polystyrenes, the carbohydrate acetate phthalates, e.g., starch acetate phthalate, cellulose acetate phthalate and amylose acetate phthlate, polymethacrylic acid, methyl vinyl ether-maleic acid copolymer, the poly basic polymers, deacylated chitin, sometimes called chitosans, polyvinylpyrrolidine, the copolymer produced from polyvinylpyridine and styrene, or from triethanolamine and phthalic acid, and polyamino acids, e.g., polylysine, polyornithine and poly-p-aminophenylaniline.

Preferred among the polymers employed in this invention are the hydrolyzed styrene-maleic anhydride copolymers the anhydride groups of which are preferably at least 50% hydrolyzed. The copolymer can also contain other polymer units in minor amounts, e.g., those derived from acrylonitrile, acrylic acid, methacrylic acid, itaconic acid, ethyl vinyl ether, methyl vinyl ether, vinyl chloride, vinylidene chloride, etc., and the like. As used in the present specification, the term hydrolyzed styrene-maleic anhydride copolymer is meant to include these modifications as well as other modifications in the structure and method of preparation which do not alter the essential lipophilic and hydrophilic properties of the copolymer.

The preferred polymers of the present invention can be represented by the following formula:

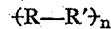

wherein R represents lipophilic polymer units of which more than 70% are styrene residues, the other ethylenic residues, when present, being those of, e.g., acrylonitrile, acrylic acid, methacrylic acid, itaconic acid, vinyl chloride, vinylidene chloride, and the like, and R' represents hydrophilic polymer units of which more than 50% are maleic acid residues, preferably more than 70%, with the ratio of R to R' being from 1:1 to about 4:1 preferably from 1:1 to about 1.2:1 and $n$ is an integer from about 90 to about 1,000. The average molecular weight of the copolymer ranges preferably from about 20,000 to about 200,000.

Copolymers employed in this invention are well known in the art. For example, styrene-maleic anhydride copolymer, which is readily hydrolyzable to styrene-maleic acid copolymer, is a commercially available compound. Resin SC-2 is available from the Monsanto Chemical Company and is a modified styrene-maleic anhydride copolymer. These copolymers are hydrolyzed to obtain a styrene-maleic acid copolymer which is useful as material in the present invention. The hydrolysis can be partial or it can be complete and involves a conversion of the acid anhydride linkages to α-dicarboxylic acid units. It is preferred that the hydrolysis be substantially complete, i.e., more than about 50% complete.

E. I. du Pont de Nemours and Company (Grasselli Chemicals Department) sells a product called "G-942" Tanning Agent, which is a partial sodium salt of a hydrolyzed styrene-maleic anhydride copolymer in a 25% water solution. This solution can be used as such or in the free acid form which can be obtained by precipitation with acid, e.g., hydrochloric or sulfuric acid, washing the precipitate with water, and drying the product in an oven at 60° C. or in vacuo at room temperature.

Between pH 1 and 2.5 (the pH found in a normal stomach) a styrene-maleic acid copolymer as defined herein is only 0 to 1% ionized and thus is insoluble at this pH, making this copolymer a useful enteric mantle for oral products whose active ingredient is most efficaciously utilized when absorbed in the intestines rather than the stomach.

Lipophilic materials which are encapsulated in this invention include the animal and vegetable fats, e.g., hydrogenated cottonseed, soybean and peanut oils, butter, lard, beef fat and lanolin, the animal, vegetable and mineral oils, e.g., cottonseed, soybean, peanut, corn and coconut oil; the waxes and wax-like solids, e.g., carnauba, soybean and corn waxes, paraffin, soysterols, cholesterol, ergosterol, and any other liquid or solid lipophilic material which is substantially insoluble in the aqueous solution employed in the process of this invention.

Aqueous solutions of the polymer which can be employed in the process of this invention include water solutions and homogeneous aqueous solvent mixtures which include, e.g., the lower-alkanols, especially methanol and ethanol, the lower alkylene glycols, especially ethylene glycol, propylene glycol and trimethylene glycol, the lower-alkyl triols, especially glycerol, and aqueous mixtures of the above. As will be noted from the above, preferred are water and aqueous mixtures of low-molecular weight, water-miscible hydroxy compounds. The glycols and triols are also useful additives to prevent coalescence of the encapsulated product and produce a product having superior handling properties. The presence of added acid sufficient to produce a very low pH is ordinarily not desirable as the result will be that the polymer may be precipitated as a solid, rather than a liquid, thus preventing the encapsulating process from occurring.

The insolubilizing salts are those inorganic and organic salts soluble in the aqueous polymer solution and whose presence therein causes the dissolved polymer to precipitate therefrom. Inorganic salts are ordinarily preferred. Included among these salts are those having metal, e.g., alkaline earth, alkali-metal, magnesium, ammonium, potassium and lithium cations and having organic or inorganic anions, e.g., sulfate, phosphate, citrate, acetate, formate, chloride, bromide, nitrate, thiocyanate, and iodide anions. The magnesium cation is ordinarily more efficacious than the lithium cation and the sulfate anion ordinarily is more efficacious than the iodide anion. The anion exerts a more profound influence on the efficacy of the insolubilizing salt than does the cation. Sodium sulfate and ammonium sulfate are highly efficacious insolubilizing agents. The salt should be added in amount sufficient to produce a significant percentage thereof by weight per volume of the resulting mixture, e.g., 1 to 50% and preferably 3 to 20%.

In carrying out the process of this invention, the selected polymer is dissolved in the selected aqueous liquid. Whether a true solution or colloidal sol is obtained depends, in part, upon the molecular size of the selected polymer. However, the exact character of the resulting solution is immaterial to the outcome of the process. A lipophilic material, either liquid or solid, is then dispersed in the resulting solution. The lipophilic particles are desirably in the size range of from about 0.5 to about 200 microns. Alternatively, the lipophilic suspension or emulsion can be prepared separately in water or a hydrophilic liquid miscible with water and the polymer dissolved in another portion of water or an aqueous mixture miscible with the first and the solution of the polymer and the resulting emulsion or suspension then mixed.

The solubility of the polymers employed in this invention vary considerably in a selected aqueous liquid. For example, completely hydrolyzed styrene-maleic anhydride polymer is about 2% soluble in water but at least 20% soluble in a 50:50 mixture of methanol and water. Thus, solutions of the desired polymer can be prepared in relatively dilute form in water alone. Alternatively, the concentration of the polymer can be increased by the addition of the solubilizing agent, e.g., another hydrophilic liquid such as, for example, methanol or ethanol. Another type of solubilizing agent useful when carboxylic acid polymers are employed are the polysaccharides, e.g., alginates, pectins, methylcellulose, carboxymethylcellulose, etc. Of particular usefulness are the galactose polysaccharides, e.g., derived from Irish moss (carrageen), available as SeaKem, Type No. 1, from Seaplant Chemical Corporation, New Bedford, Massachusetts. For example, the solubility of completely hydrolyzed styrene-maleic anhydride copolymer in water can be raised from about 2% to about 7 to 10% in the presence of relatively small amounts of this polysaccharide, e.g., one part to four parts of the copolymer. Higher concentrations of the acid polymers can also be achieved by passing a solution of an alkali-metal salt thereof through a bed of sulfonic acid ion exchange resin, e.g., Dowex 50.

As stated previously, materials can be dissolved or suspended in the lipophilic material, and then emulsified or suspended in the selected hydrophilic liquid. Ordinarily, the desired lipophilic material with, if desired, dissolved or suspended material therewith is rapidly agitated with an aqueous solution of the polymer, e.g., in a Waring Blendor, or passed through a colloid mill until the desired particle size is achieved, i.e., an average particle size of from 0.5 to 200 microns. Alternatively, a separate aqueous solution of the selected polymer is prepared and mixed with a previously prepared lipophilic suspension or emulsion in water or other hydrophilic liquid miscible with the polymer solution.

The resulting mixture is then separated into a polymer-rich phase and a polymer-poor phase by the addition of an insolubilizing salt. The proper amount of insolubilizing salt to be added is readily determined beforehand by the addition of increasing amounts of the selected insolubilizing salt to a previous solution of the polymer, identical with that to be employed in the encapsulating process, until liquid precipitation of the polymer occurs in an appreciable amount. This is initially observable as a visible clouding of the solution which in some instances may progress to a stable dispersion of microscopic droplets of the polymer-rich sol; in other instances the droplets may coalesce and separate from the solution as a sticky coherent phase.

In the presence of the finely dispersed lipophilic material, the precipitating polymer coats the lipophilic particles, forming a mantle thereover, thus producing the encapsulated product of this invention. The thickness of the mantle can, within limits, be controlled by the ratio of lipophilic material to polymer. Thus, if a thicker mantle is desired, more polymer should be employed. As is apparent, the smaller the particle size of the lipophilic material, the greater the total surface area per unit weight, thus requiring larger amounts of polymer in order to achieve the same mantle thickness as that obtained when employing the same weight of lipophilic material of larger particle size.

In the next step of the process, the pH of the solution containing the encapsulated product is adjusted so as to reduce the solubility of the mantle of the thus-produced encapsulated product in the aqueous solution. If the starting polymer is acidic in character, then the solution is made quite strongly acidic. Conversely, if the polymer is basic in character the solution is made quite strongly basic. In general, it can be said that in this step, the ionizing properties of the mantle is reduced, thus reducing its affinity towards the aqueous solution. The correct pH can be determined by visual means, either by observing a change in the appearance of the encapsulated product or by observing the particles under a microscope. The mantle as it originally forms has a somewhat transparent appearance whereas when it is converted to isoable form by adjustment of the pH, it becomes more opaque or translucent. Any strong acid or base can be employed to adjust the pH, e.g., hydrochloric, sulfuric and acetic acid and sodium and potassium hydroxide.

The instant process is thus considerably different from that claimed in U.S. 2,800,457 and 2,800,458, both in the material used to encapsulate and the process by which an isolable encapsulated product is produced. In the patented processes, the critical step in producing an isolable product is the step of chilling below the gelation temperature of the gelable colloid employed to encapsulate. In the instant process, gelability is not a critical characteristic of the polymer employed. Instead, the combination of lipophilic and hydrophilic polymer units in the polymer enable the polymer to encapsulate lipophilic materials while at the same time having ionizing properties which can be altered by the adjustment of the pH of the aqueous solution. Thus, when the polymer mantle is formed, it is "fixed" by adjusting the pH of the aqueous solution in which the encapsulated product is suspended, thereby producing a mantle which is rigid enough to permit isolating the encapsulated product from the suspending liquid.

The thus-produced encapsulated product can be isolated by centrifugation or filtration to remove the aqueous liquid and then washing the encapsulated material, e.g., with water, but avoiding such vigorous washing as will redissolve a significant amount of the polymer mantle. Alternatively, the total reaction product can be freeze dried or dried at room temperature to about 60° C., e.g., under vacuum. As is apparent, excessive heating should be avoided if a solvent for the polymer is employed as the polymer mantle may thereby be dissolved in the wash liquid.

The mantle of the encapsulated product can be further hardened by exposure to reagents which will chemically alter the surface groups of the polymer mantle, e.g., the polymer can be reacted with a monomer to produce cross-linking, or reacted with a salt containing a polyvalent cation, e.g., aluminum sulfate or barium chloride, when the structure of the polymer permits, or irradiated with, e.g., high velocity electron bombardment, to change the molecular structure of the monomer and, desirably to concomitantly sterilize the encapsulated lipophilic material.

The following preparation and examples are illustrative of the composition, article and process of the present invention but are not to be construed as limiting.

PREPARATION 1

Add with thorough mixing one liter of C.P. sulfuric acid slowly to 20 kg. of a 25% w./w. aqueous solution of the half sodium salt of styrene-maleic acid copolymer (Du Pont G–942 Tanning Agent). Stir for one-half hour and then dilute with five gallons of deionized water. Stir for another one-half hour and separate by centrifugation. Slurry the solids with five gallons of deionized water and centrifuge. Dry the solids in an air dryer for 120 hours at 35° C. Grind to a coarse powder in a mill. Complete the drying in an air dryer at 35° C. for an additional 49 hours. An almost quantitative yield of styrene-maleic acid copolymer is obtained.

Table I gives data on various preparations of the copolymers of the present invention by hydrolysis of the corresponding styrene-maleic anhydride copolymers. By varying the degree of agitation, batch size, temperature of the water and heating time various degrees of hydrolysis can be obtained. Hydrolysis can also be carried out by use of alkali as indicated in the table.

dropwise to the oil-water emulsion. Prepare a solution of 100 ml. of 20% aqueous sodium sulfate and 10 ml. of glacial acetic acid in 500 ml. of water. Add the above mixture to this solution with continuous stirring. Separate the suspended material by centrifugation, wash with cold water and then resuspend in 100 ml. of water and freeze dry.

*Table I*

HYDROLYSIS OF STYRENE-MALEIC ANHYDRIDE COPOLYMER (SY-M) AND RESIN SC-2

| | Hydrolysis Conditions | Drying Conditions | Wt. of Starting Material—Wt. of Product (Gms.) | Percent Water | Percent Anhydride—Percent Dicarboxylic Acid |
|---|---|---|---|---|---|
| A | 1011 Gm. SY-M in 5.5 gallons of 2.5% sodium hydroxide was heated at 60–70° C. for five hours. Dilute hydrochloric acid was then added dropwise with stirring until the pH had dropped to about pH 3. The precipitated copolymer was recovered by vacuum filtration. | 120 hours at 25° C. in vacuo | 1,011 (SY-M) / 1,100 | 8.22 | 0 / 100 |
| B | 1 kg. Resin SC-2 added to 10.1. of 2% aqueous sodium hydroxide. After 1½ hrs. stirring, pH was 7.00. Product precipitated with dilute hydrochloric acid. | Low-humidity oven at 60° C. for 41 hours. | 1,000 (Resin SC-2) / 875 | | <5 / >95 |
| C | 4% suspension in water heated for 2 days at 60°–5° C. with vigorous stirring. | Freeze-dried with shelf temperature not above 26° C. (80° F.). | 250 (SY-M) / 267 | | <5 / >95 |
| D | ibid | ibid | 1,000 (SY-M) / 948 | 4.07 | 10 / 90 |
| E | ibid | In vacuo at 20° C. / Further 7 days at 38.3° C., 10% relative humidity. / Further 3 days at 60° C., air-circulating oven. | 3,000 (SY-M) / 3,300 | 10.6 / 7.36 / 4.26 | 20 / 80 / 20 / 80 / 20 / 80 |
| F | ibid | 60° C. in air-circulating oven | 4,536 (SY-M) / 4,560 | 1.65 | 30 / 70 |
| G | 2 kg. Resin SC-2 heated with stirring in 2.5 gallons water at 100° C. for 5.25 hours. | 6 days at 38° C., 10% relative humidity. | 2,000 (Resin SC-2) / 1,640 | | <50 / >50 |
| H | 200 Gm. "Stymer S" (Monsanto: partial sodium salt of Resin SC-2) dissolved in 2 l. water at 80° C. with stirring. Dilute hydrochloric acid added dropwise with stirring to precipitate the hydrolyzed Resin SC-2. Latter washed by decantation and dried. | 89 hours at 60° C | 200 (Stymer S) / 117 | | <50 / >50 |

EXAMPLE 1

Materials:
Styrene-maleic acid copolymer (Preparation 1) _____ g__ 25
Water, q.s.
White mineral oil _____ ml__ 25
Sodium sulfate, 20% aqueous _____ ml__ 2775
Glacial acetic acid _____ ml__ 250

Disperse the copolymer in 1250 ml. of water and heat to 80° C. Heat the oil to 80° C. Emulsify the oil into the copolymer solution by passing the mixture through a hand homogenizer four times. With constant stirring of the emulsion, add dropwise 275 ml. of the sodium sulfate solution, previously heated at 80° C. Maintain the mixture at 80° C. for 20 minutes.

Mix the glacial acetic acid with 2500 ml. of the sodium sulfate solution. Cool this solution to about 5° C. With vigorous stirring, slowly add the emsulsion mixture to the cool, acidified sodium sulfate solution.

Separate the solids by centrifugation. Wash with small portions of water. Resuspend the solids in 500 ml. of water and freeze dry. Examination of the resulting product under a microscope shows a mixture of dry, discrete bead-like particles and occluded grape-like bunches having a thin polymer mantle. The particles rupture under pressure or dissolve in a large volume of water at a pH above about 2.5.

EXAMPLE 2

Disperse 5 g. of styrene-maleic acid copolymer (Preparation 1) in 250 ml. of water and add 0.2 ml. of Tween 80 (polyoxyethylene sorbitan monooleate). Heat the mixture to 80° C. Heat 20 ml. of white mineral oil to 80° C. and add to the aqueous mixture. Emulsify the resulting mixture by passing three times through a hand homogenizer. Heat 20 ml. of a 20% aqueous sodium sulfate solution to 80° C. and with continuous stirring add

EXAMPLE 3

To 500 ml. of water, add 5 g. of styrene-maleic acid copolymer (Preparation 1) and 1.25 g. of SeaKem, Type No. 1, Irish moss polysaccharide, as a solubilizer. Add 50 ml. of propylene glycol as an anti-coalescence agent, followed by 500 ml. of water and heat the mixture to 80° C. Add 20 ml. of white mineral oil heated to 80° C. to the mixture and emulsify three times in a hand homogenizer. Heat a solution of 60 ml. of sodium sulfate to 80° C. and add dropwise with continuous stirring to the oil-water emulsion. No coalescence or aggregation occurs. At room temperature add the resulting mixture with continuous stirring to a solution of 100 ml. of 20% aqueous sodium sulfate, 10 ml. of glacial acetic acid and 500 ml. of water. Separate the suspended material by centrifugation, wash with cold water and then resuspend in 100 ml. of water and freeze dry.

EXAMPLE 4

Follow the procedure of Example 3, but use styrene-maleic acid polymer continuing about 30% anhydride units (Preparation F) and use about 1,500 ml. of water to achieve solution.

EXAMPLE 5

Follow the procedure of Example 3, but substitute an equal weight sulfonated polystyrene as the polymer.

EXAMPLE 6

Follow the procedure of Example 3, but substitute an equal weight of starch acetate phthalate as the polymer.

EXAMPLE 7

Follow the procedure of Example 3, but substitute an equal amount of ammonium sulfate for the sodium sulfate as the insolubilizing agent.

EXAMPLE 8

Follow the procedure of Example 1, but substitute 10:90 methanol-water as the solvent for the copolymer.

EXAMPLE 9

Follow the procedure of Example 3, but substitute peanut oil for the mineral oil.

EXAMPLE 10

10 g. of 2,4-dichlorophenoxyacetic acid is dissolved in 100 ml. of white mineral oil. A solution of 40 g. of cellulose acetate phthalate in 1,600 ml. of water is prepared at 60° C. and adjusted to a pH of 9.7 by the addition of 10% sodium hydroxide. The oil is then emulsified into the cellulose acetate phthalate solution. 450 ml. of 20% aqueous sodium sulfate is heated to 60° C. and added dropwise to the emulsion with continuous stirring. The temperature is maintained at 60° C. for 30 minutes and then lowered to 10° C. over a period of 30 minutes. 10 ml. of glacial acetic acid is added to the mixture, the solids separated by filtration, washed with cold water and air dried. The preparation is a long acting weed killer.

EXAMPLE 11

Follow the procedure of Example 10 exactly but substitute ammonium sulfate for the sodium sulfate.

What is claimed is:

1. A process for the encapsulation of finely divided lipophilic material wherein the capsule mantle consists essentially of a polymer, which process includes the steps of (1) preparing a dispersion of lipophilic material selected from the group consisting of fats, oils, waxes and wax-like solids in an aqueous liquid solution of a styrene maleic anhydride copolymer, the anhydride groups of which are at least 50% hydrolyzed, (2) adding insolubilizing salt until a visible clouding is observed, (3) adjusting the pH of the mixture until an opacity in the mantle is observed, and (4) separating the thus-produced capsules from the aqueous liquid.

2. The process of claim 1 wherein the aqueous liquid comprises a glycol.

3. The process of claim 1 wherein the aqueous liquid comprises propylene glycol.

4. The process of claim 1 wherein the aqueous liquid comprises a lower-alkanol.

5. The process of claim 1 wherein the aqueous liquid comprises methanol.

6. The process of claim 1 wherein the aqueous liquid has a pH greater than 2.

7. The process of claim 1 wherein the lipophilic material is a substantially water-insoluble oil.

8. The process of claim 1 wherein the lipophilic material is a substantially water-insoluble, edible vegetable oil.

9. The process of claim 1 wherein the lipophilic material is a substantially water-insoluble, physiologically inert mineral oil.

10. The process of claim 1 wherein the particle size of the lipophilic material averages between 1 and 100 microns.

11. The process of claim 1 wherein the insolubilizing salt is an inorganic salt.

12. The process of claim 1 wherein the insolubilizing salt is an inorganic salt of a mineral acid.

13. The process of claim 1 wherein the insolubilizing salt is sodium sulfate.

14. A process for the encapsulation of finely divided lipophilic material wherein the capsule mantle comprises a polymer, which process includes the steps of (1) preparing a dispersion of lipophilic material selected from the group consisting of fats, oils, waxes and wax-like solids in an aqueous solution consisting essentially of water containing dissolved therein a styrene maleic anhydride copolymer, the anhydride groups of which are at least 50% hydrolyzed, (2) adding an inorganic salt until a visible clouding is observed, (3) adjusting the pH of the mixture until an opacity in the mantle is observed, and (4) separating the thus-produced capsules from the water.

15. The process of claim 14 wherein the aqueous solution comprises a lower-alkyl glycol.

16. The process of claim 14 wherein the aqueous solution comprises propylene glycol.

17. The process of claim 14 wherein the inorganic salt is sodium sulfate.

18. The process of claim 14 wherein the inorganic salt is ammonium sulfate.

19. The process of claim 14 wherein the lipophilic material is a vegetable oil.

20. The process of claim 14 wherein the polymer is styrenemaleic acid polymer.

21. The process of claim 14 wherein the aqueous solution comprises a polysaccharide as a solubilizer for the polymer.

22. The process of claim 14 wherein the aqueous solution comprises a polysaccharide derived from Irish moss as a solubilizer for the polymer.

23. The process of claim 1 wherein the aqueous liquid is water.

24. The process of claim 14 wherein the aqueous liquid is water.

25. The process of claim 1 wherein the polymer is styrene maleic acid copolymer.

26. The process of claim 14 wherein the polymer is styrene maleic acid copolymer.

References Cited in the file of this patent

UNITED STATES PATENTS

| | | |
|---|---|---|
| 2,006,002 | Schneider | June 25, 1935 |
| 2,698,794 | Godowsky | Jan. 4, 1955 |
| 2,800,457 | Green et al. | July 23, 1957 |
| 2,800,458 | Green | July 23, 1957 |
| 2,897,121 | Wagner | July 28, 1959 |
| 2,969,330 | Brynko et al. | Jan. 24, 1961 |
| 2,969,331 | Brynko et al. | Jan. 24, 1961 |